April 10, 1928.
P. E. NORRIS
1,665,603
STORAGE BATTERY
Filed May 26, 1924
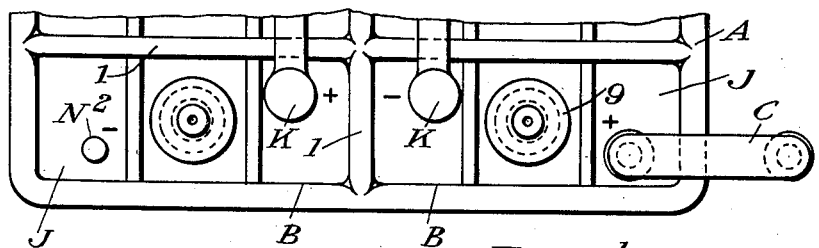
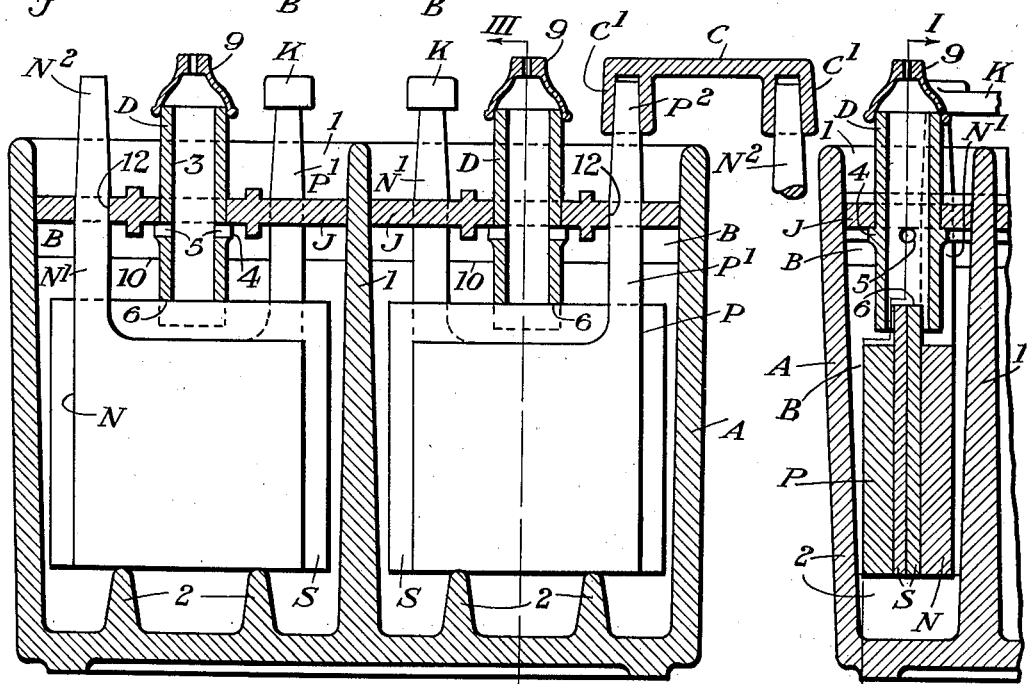
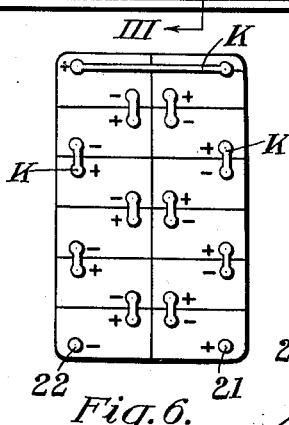
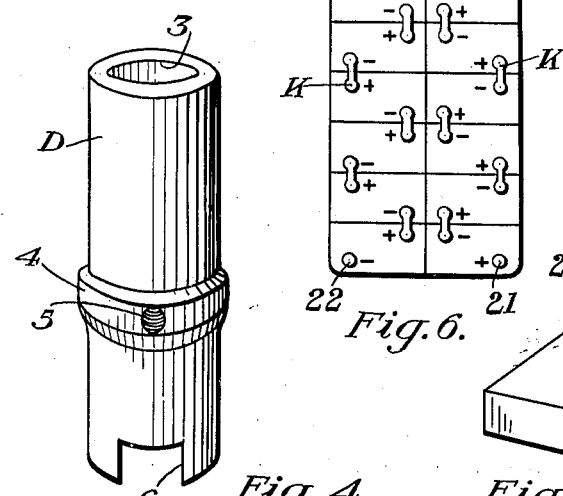
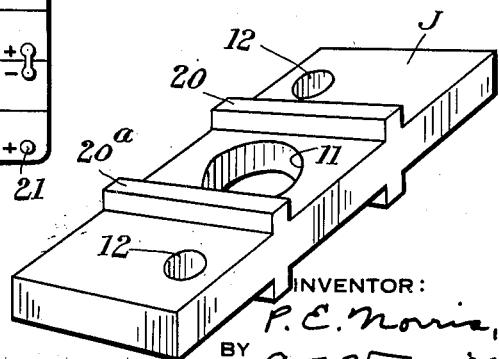

Patented Apr. 10, 1928.

1,665,603

UNITED STATES PATENT OFFICE.

PAUL E. NORRIS, OF WILKINSBURG, PENNSYLVANIA, ASSIGNOR TO WESTINGHOUSE UNION BATTERY COMPANY, OF SWISSVALE, PENNSYLVANIA, A CORPORATION OF PENNSYLVANIA.

STORAGE BATTERY.

Application filed May 26, 1924. Serial No. 715,945.

My invention relates to storage batteries.

I will describe one form of storage battery embodying my invention, and will then point out the novel features thereof in claims.

In the accompanying drawing, Fig. 1 is a vertical transverse sectional view along line I—I of Fig. 3 and showing one form of storage battery embodying my invention. Fig. 2 is a top plan view showing a portion of the battery shown in Fig. 1. Fig. 3 is a view showing a portion of the battery in section along line III—III of Fig. 1. Fig. 4 is a detail view showing in perspective one of the vent tubes D of the battery shown in Figs. 1, 2 and 3. Fig. 5 is another detail view illustrating a cell cover designed to receive the vent tube shown in Fig. 4. Fig. 6 is a top plan view showing the arrangement of the battery cells in the jar.

Similar reference characters refer to similar parts in each of the several views.

Referring first to Figs. 1, 2 and 3, the battery comprises a battery jar A of insulating material such as hard rubber or glass. The interior of jar A is divided into a plurality of compartments B by upwardly extending intersecting ribs 1 which are preferably integral with jar A, so that the jar contains two parallel rows of compartments, each row preferably having six compartments, as shown in Fig. 6. The bottom of each compartment B is provided with two spaced upwardly projecting plate rests 2. Each compartment contains a battery element comprising a positive plate P and a negative plate N resting upon the plate rests 2 and having interposed therebetween one or more separators S which separators are also supported by the plate rests 2.

The top of each compartment is closed by a comparatively soft, pliable rubber cell cover J shown in detail in Fig. 5. Each cell cover J is provided with two spaced holes 12, 12. Each positive plate P is provided with an upwardly extending terminal lug P′ which passes through one hole 12 of the associated cover and terminates in a connecting tip P². In a similar manner each negative plate N has a terminal lug N′ which passes through the other hole 12 in the associated cell cover and terminates in a connecting tip N².

Each compartment is further provided with a vent tube D of comparatively hard rubber and provided near its center with a shoulder 4 extending circumferentially around the vent tube as best seen in Fig. 4. Each cell cover J is provided with a centrally disposed hole to receive the corresponding vent tube, the parts being so proportioned that the cover has to be stretched to get it over the main body of the tube, thus insuring a liquid tight joint when the tube is in place with shoulder 4 against the lower face of the cover. The bottom of each vent tube D is provided with a notch 6 to straddle the associated separators S, and the top of each vent tube is covered by a soft rubber cap 9, held in place by the resiliency of the cap in the usual and well known manner.

The upper surface of each cover J is provided with two transversely extending ribs 20—20$^a$ spaced on opposite sides of hole 11 for the purpose of preventing short circuiting of the element should any acid be present on the top of the cell cover. In assembling the battery some of the covers are placed in the jar upside down and ribs 20, 20$^a$ are therefore provided on the underside of the cover.

In assembling the battery, each compartment undergoes the same operation so the description for one will suffice for all. A positive plate P and a negative plate N, with one or two separators between them, are first placed in the jar, and a cover J with tube D in place therein is then slipped down into the compartment so that the notch 6 at the bottom of the tube straddles the top edges of the separators S. In this position the cell cover comes in contact with the walls of the compartment snugly all around and insures a tight joint, and terminal lugs N′ and P′ project through holes 12. Electrolyte 10 is then admitted to the compartment through the hole 3 in vent tube D. To permit escape of air while filling the battery and to allow escape of generated gas during operation of the battery, two holes 5 are provided in the walls of vent tube D just below the cell cover and above the level of the electrolyte 10. The cap 9 is then placed upon the top of the vent tube to complete the cell.

The cells of the battery are connected in series by means of links K, burned to the tips of the positive terminal lug of one element and the negative terminal lug of the next.

As shown in Fig. 6, the elements are so disposed in the various cells that the free terminal lugs 21 and 22 of the end cells are respectively adjacent two opposite walls of the jar, thus separating these terminals as far as possible to prevent leakage and possibility of accidentally short circuiting the battery.

For connecting the terminal lugs of the end cells of the battery with other apparatus I prefer to construct the tips $P^2$ and $N^2$ of these lugs with a frusto conical shape or taper. A connector C of suitable material such as antimony lead may be used to make connection to these tips. This connector is provided with a socket C' the interval faces of which have substantially the same taper as the tips of the terminal lugs. The connector is forced over the tip of one of the terminal lugs, thus insuring perfect electrical contact. The free end of the connector may have another similar socket for connection to a second battery, or may connect to an external circuit in any desired manner.

It should be particularly pointed out that with my invention the vent tube is held firmly in position and hence holds the separators against movement in the cell thus preventing side sway or floating up in the electrolyte.

One advantage of my invention is the feature of making the vent tube of hard rubber and the cell cover of soft rubber. This construction permits the necessary rigidity of the vent tube and at the same time makes possible a tight fit between the vent tube and the cover and between the cover and the compartment wall.

Although I have herein shown and described only one form of storage battery embodying my invention, it is understood that various changes and modifications may be made therein within the scope of the appended claims without departing from the spirit and scope of my invention.

Having thus described my invention, what I claim is:

1. A storage battery comprising a jar, a separator in said jar, a cell cover in said jar, and a vent tube passing through said cell cover and engaging said separator.

2. A storage battery comprising a jar, a separator in said jar, a substantially cylindrical vent tube engaging said separator and provided with a circumferential shoulder, and a cell cover provided with a hole adapted to receive said tube and supported by said shoulder.

3. A storage battery comprising a jar, a separator in said jar, a cell cover provided with a hole, and a vent tube of substantially cylindrical shape passing through said hole and provided with a circumferential shoulder engaging the under side of said cell cover, said vent tube also having a notch at its lower end to straddle said separator.

4. A storage battery comprising a jar, a separator in said jar, a cell cover in said jar, and a vent tube separate from said cell cover but fastened thereto and coacting with said separator to prevent motion of the separator in the jar.

5. A storage battery comprising a jar, a separator in said jar, a cover for said jar, and a vent tube attached to said cover and projecting into said jar to hold said separator down and to prevent sidewise motion of said separator.

6. A storage battery comprising a jar containing electrolyte and a separator and provided with a cell cover, and a vent tube projecting from said cover into said jar and having a notch at its lower end to straddle said separator.

In testimony whereof I affix my signature.

PAUL E. NORRIS.